United States Patent [19]
Cheng et al.

[11] Patent Number: 6,083,020
[45] Date of Patent: Jul. 4, 2000

[54] DEVICE FOR CONNECTING A CAR ANTENNA TO A PORTABLE TELEPHONE

[75] Inventors: Yin-Shiang Cheng, Taipei; Hsueh-Wen Sun; Long-Jyh Pan, both of Taipei Hsien, all of Taiwan

[73] Assignee: Acer Peripherals, Inc., Taiwan

[21] Appl. No.: 09/112,135

[22] Filed: Jul. 9, 1998

[30] Foreign Application Priority Data

Aug. 19, 1997 [TW] Taiwan ................................ 86214063

[51] Int. Cl.$^7$ .................................................. H01R 29/00
[52] U.S. Cl. ......................... 439/188; 200/51.1; 439/916
[58] Field of Search .................................... 439/188, 916; 200/51.1

[56] References Cited

U.S. PATENT DOCUMENTS

| | | | |
|---|---|---|---|
| 3,946,390 | 3/1976 | Alexander et al. | 439/188 |
| 4,286,335 | 8/1981 | Eichler et al. | 200/51.1 |
| 5,625,177 | 4/1997 | Yukinori et al. | 439/188 |
| 5,936,581 | 8/1999 | Roshitsh | 439/916 |

FOREIGN PATENT DOCUMENTS

2 222 493A  3/1990  United Kingdom .

*Primary Examiner*—Renee Luebke
*Assistant Examiner*—T C. Patel
*Attorney, Agent, or Firm*—Pillsbury Madison & Sutro LLP

[57] ABSTRACT

A connecting device connecting a car antenna to the internal circuit of a portable telephone directly without going through a reed or a printed circuit board (PCB) trace. The connecting device is disposed in proximity to the antenna of the portable telephone. The car antenna is coupled to a connector which is to be disposed in a receiving portion formed in proximity to the antenna of the portable telephone. The connecting device includes a circuit board on which an internal circuit is mounted disposed in the portable telephone; a switch element which is electrically connected to the internal circuit and is mounted on the circuit board; and a connecting member mounted on the circuit board. The connecting member can electrically connect the switch element to the connector of the car antenna when the connector is received in the receiving portion and can electrically connect the switch element to the antenna of the portable telephone when the connector is not received in the receiving portion.

7 Claims, 7 Drawing Sheets

DEVICE FOR CONNECTING A CAR ANTENNA TO A PORTABLE TELEPHONE

FIELD OF THE INVENTION

The present invention relates to a device for connecting a car antenna to a portable telephone, and in particular to a device that connects a car antenna to a portable telephone and minimizes the attenuation and interference to the transmission of signals from the car antenna to the portable telephone.

DESCRIPTION OF THE RELATED ART

Figure 1:
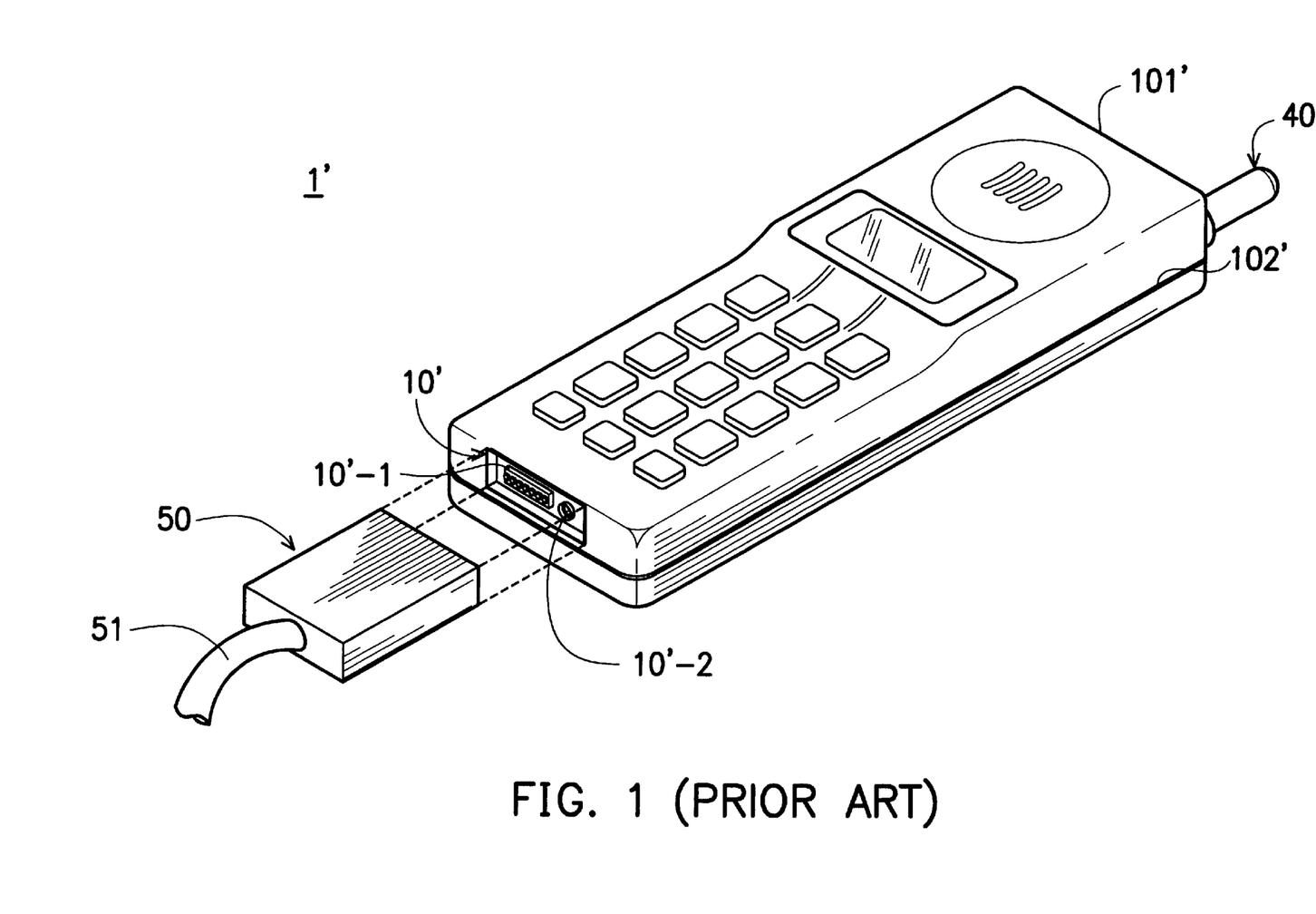
FIG. 1 is a perspective view showing a connector for a car antenna which is to be mounted on a recessed portion formed at the bottom end surface of a portable telephone.

Referring to FIG. 1, an antenna 40 is usually disposed on the top end surface of a portable telephone 1' which consists of a transceiver section 101' and a battery section 102'. On the opposite end surface of the portable telephone, a recessed portion 10' is formed. In the recessed portion 10', a first connector 10'-1 and a second connector 10'-2 are disposed for connecting to a primary connector 50. The primary connector 50 is coupled to a car antenna (not shown) by a cable 51 in situations where the user wishes to use the car antenna to obtain a better signal-receiving performance. According to a conventional design, the antenna of both the portable telephone and the car antenna are designed to be first physically connected to the printed circuit board (PCB) trace via a reed and then connected to the internal circuit via a connector disposed within the transceiver. As the internal circuit is disposed in proximity to the antenna 40 of the portable telephone set, the signals coming from the car antenna via the connector 50 are transmitted to the internal circuit through a long path. Thus, during the transmission between the car antenna and the internal circuit, the signals are easily attenuated and interfered with. Besides, such a design inevitably complicates the mechanical structure of a portable telephone, and thus increases the manufacturing cost.

SUMMARY OF THE INVENTION

It is therefore an object of the invention to provide a device for connecting a car antenna to a portable telephone set capable of eliminating the above disadvantages.

In order to attain the above object, the car antenna is connected to the internal circuit via a connecting device directly, without going through a reed or a PCB trace. The connecting device of the invention is disposed in proximity to the antenna of the portable telephone.

Specifically, the car antenna is coupled to a connector which is to be disposed in a receiving portion formed in proximity to the antenna of the portable telephone. And the connecting device of the invention includes a circuit board on which an internal circuit is mounted disposed in the portable telephone; a switch element which is electrically connected to the internal circuit and is mounted on the circuit board; and a connecting member mounted on the circuit board. The connecting member can electrically connect the switch element to the connector of the car antenna when the connector is received in the receiving portion and can electrically connect the switch element to the antenna of the portable telephone when the connector is not received in the receiving portion.

According to an aspect of the invention, the switch element is a curved metal strip, and the connecting member includes a base mounted in the receiving portion, a first guiding member received in the base, a positioning member mounted on the circuit board, a second guiding member received in the positioning member, and a metal pin slidably received between the first guiding member and the second guiding member.

According to another aspect of the invention, the connecting member includes a biasing member disposed between the second guiding member and the metal pin so that the metal pin can be spaced from the curved metal strip when the connector is not received in the receiving portion.

According to a further aspect of the invention, the switch element is composed of a first metal strip and a second metal strip. The first metal strip is mounted on the circuit board and is in contact with the antenna of the portable telephone. The second metal strip is mounted on the circuit board and connected to the internal circuit in a such manner that it is in contact with the first metal strip when the connector is not received in the receiving portion, and is not in contact with the first metal strip but instead in contact with the metal pin when the connector is received in the receiving portion.

BRIEF DESCRIPTION OF THE DRAWINGS

The present invention can be fully understood by referring to the following detailed description and the preferred embodiment with references made to the accompanying drawings, in which.

DETAILED DESCRIPTION OF THE PREFERRED EMBODIMENTS

Figure 2A:
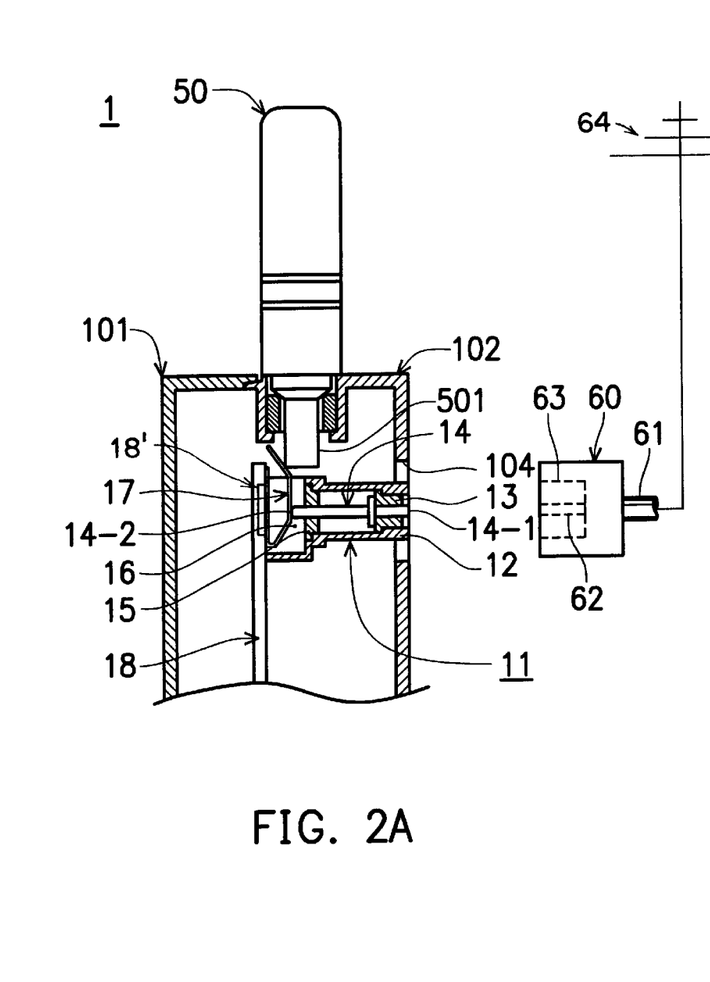
FIG. 2A is a partial sectional view showing the structure of the connecting device of the first embodiment of the invention.

Referring to FIG. 2A, a receiving portion 104 is formed on the case of the battery section 102 in proximity to the antenna 50 of the portable telephone 1. The receiving portion 104 is designed for receiving a connector 60 which is coupled to the car antenna 64 by a cable 61. A circuit board 18 is disposed in the transceiver section 101 near the antenna 50. An internal circuit 18 is mounted on the circuit board 18 for the transmission of signals received from the antenna 50 or from the car antenna 64 via the connector 60. A switch element, i.e., a curved metal strip 17, is mounted on the circuit board 18 and is electrically connected to the internal circuit 18. The free end of the metal strip 17 is in contact with the bottom end 501 of the antenna 50. The switch element 17 is connected to the connector 60 via a connecting member 11. The connecting member 11 is disposed in the receiving portion 104.

Figure 2B:
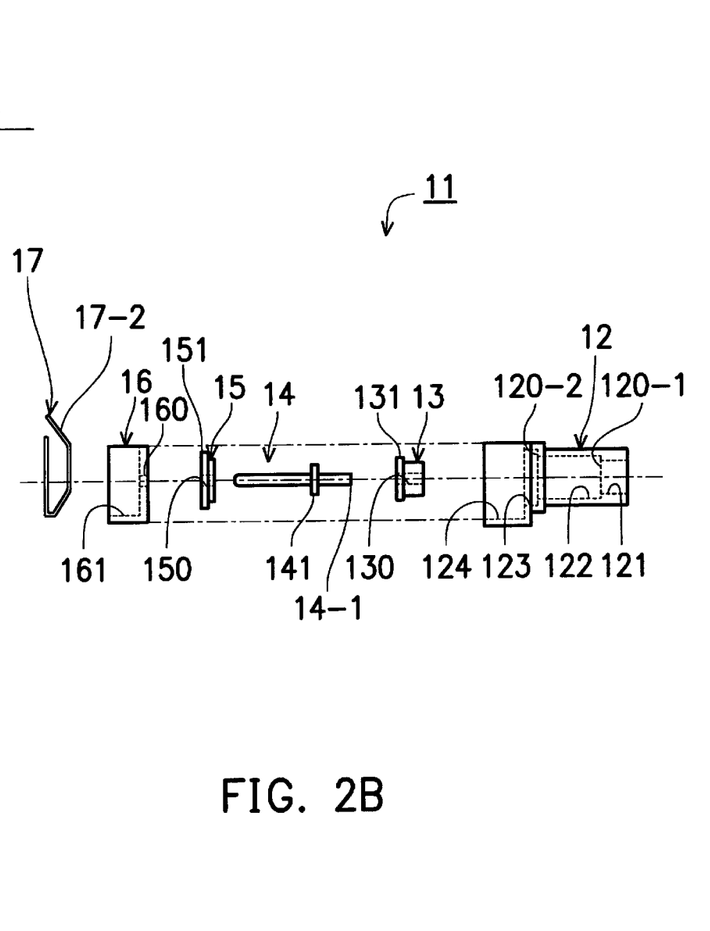
FIG. 2B is an exploded view showing the switch element and the connecting member of the connecting device shown in FIG. 2A.

Referring now to FIG. 2B, the connecting member 11 includes a base 12, a first guiding member 13, a metal pin 14, a second guiding member 15 and a positioning member 16. The first guiding member 13 is a ring member having a through hole 130 and a flange 131. The second guiding member 15 is also in the shape of a ring with a through hole 150 formed therein and a flange 151. The base 12 is a sleeve composed of two portions 120-1, 120-2. The cylindrical inner wall of the portion one 120-1 is divided into two portions, inner wall 121 and inner wall 122 so that a seat is formed for receiving the first guiding member 13 therein. The cylindrical inner wall of the portion two 120-2 is also divided into two portions, inner wall 123, and inner wall 124, for receiving the second guiding member 15 therein. The metal pin 14 is provided with a flange 141 at a position near the pin end 14-1 so that when the metal pin 14 is received between the first guiding member 13 and the second guiding member 15, the flange 141 abuts against the flange 131 of the first guiding member 13. The positioning member 16 is also a sleeve. The sleeve 16 has a hole 160 through which the metal pin 14 passes when the connecting member 11 is assembled. The curved metal strip 17 is received and positioned in the sleeve 16 with its free end 17-2 protruded toward and being in contact with the bottom end 501 of the antenna 50. Note that the first guiding member 13, the second guiding member 15 and the positioning member 16 are made of non-conducting materials such as plastics.

Referring again to FIG. 2A, when the connecting member 11 has been assembled and fitted together with the switch member 17 in the portable telephone 1 and the connector 60 is not received in the receiving portion 104, the free end of the switch member 17 is in contact with the bottom end 501 of the antenna 50 and the end 14-2 of the metal pin 14 is in contact with the flat portion of the switch member 17. This structure allows the antenna 50 to be electrically connected to the internal circuit 18 via the switch element 17.

Figure 3:
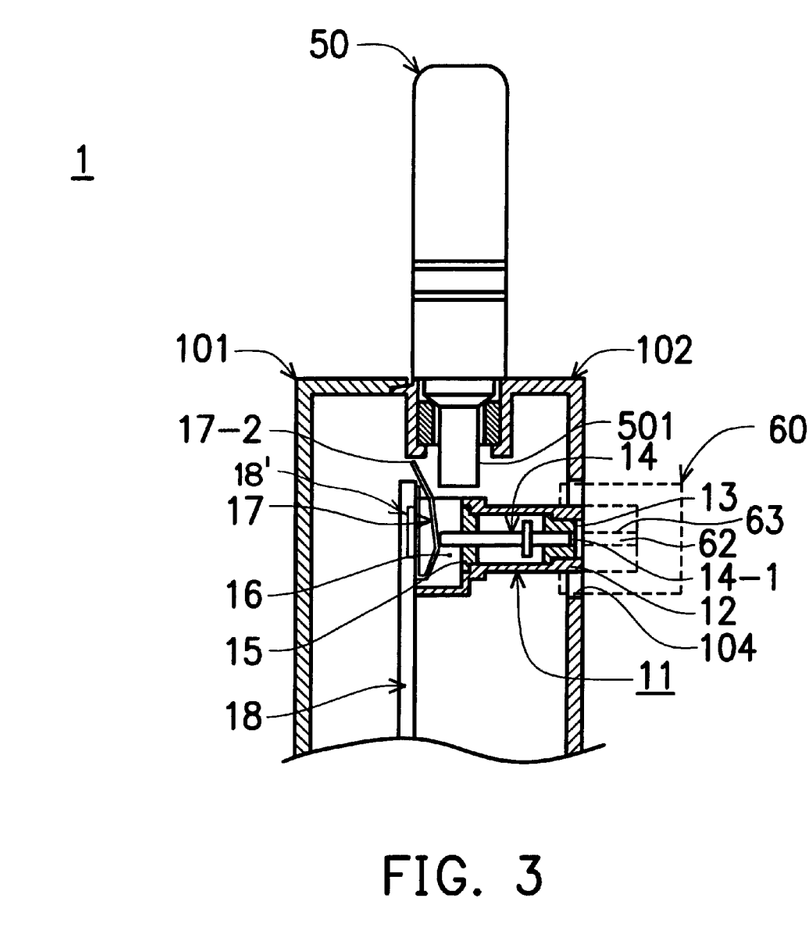
FIG. 3 is a partial sectional view showing the car antenna connected to the portable telephone by the connecting device of the first embodiment.

Referring now to FIG. 3, the connector 60 is received in the receiving portion 104. As the connector 60 is provided with a pin 62 disposed at the center of a recessed portion 63 formed in the connector 60 in line with the metal pin 14, the metal pin 14 is moved by the pin 62 to the left. As a result, the metal strip 17 is pressed and the end 17-2 is moved to become disconnected with the bottom end 501 of the antenna 50, allowing the connector 60 of a car antenna 64 to become electrically coupled to the internal circuit 18 of the portable telephone 1.

Figures 4A, 4B:
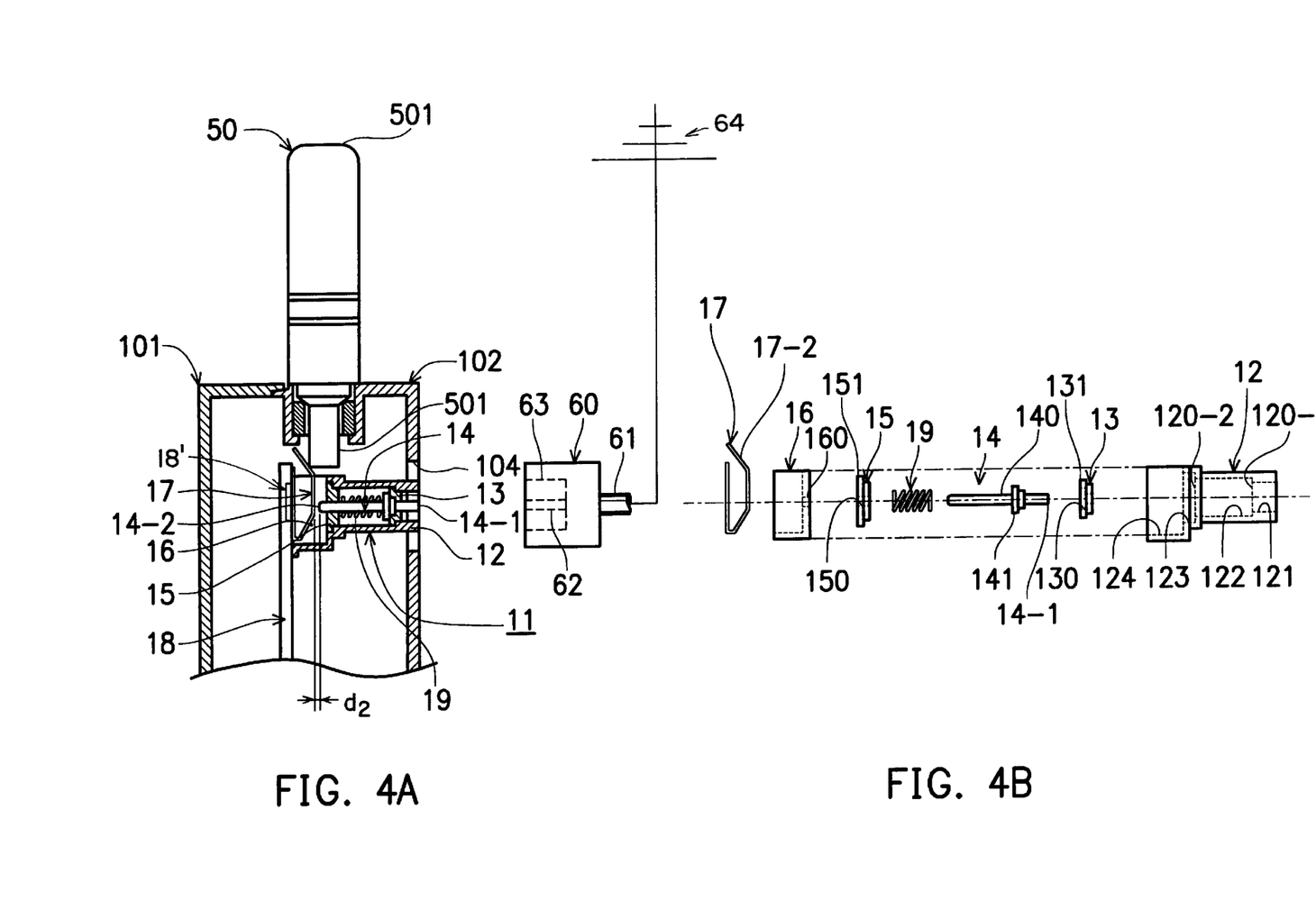
FIG. 4A is a partial sectional view showing the structure of the connecting device of the second embodiment of the invention.
FIG. 4B is an exploded view showing the switch element and the connecting member of the connecting device shown in FIG. 4A.
Figure 5:
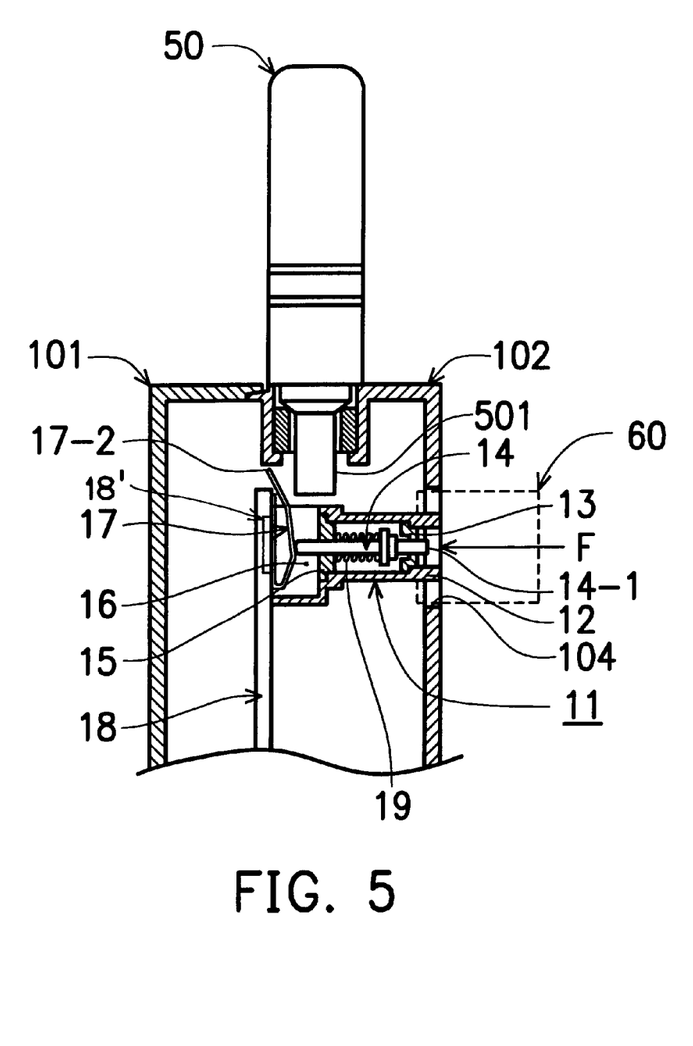
FIG. 5 is a partial sectional view showing the car antenna connected to the portable telephone by the connecting device of the second embodiment.

Referring to FIGS. 4A, 4B and 5, a second embodiment of the connecting device of the invention incorporated in a portable telephone is shown. As can be seen from these figures, the connecting device of this embodiment has substantially the same structure as the first embodiment, and thus the corresponding elements thereof are labeled with similar numerals and the related description thereof is omitted for the purpose of simplicity. In this embodiment, a coil spring 19 is additionally disposed between the second guiding member 15 and the metal pin 14. In this way, the metal pin 14 will not be in contact with the switch element 17, leaving a distance $d_2$ when the portable telephone is not connected to the connector 60 of a car antenna 64. Such a design can further assure the performance of the connecting device of the invention.

Figure 6A:
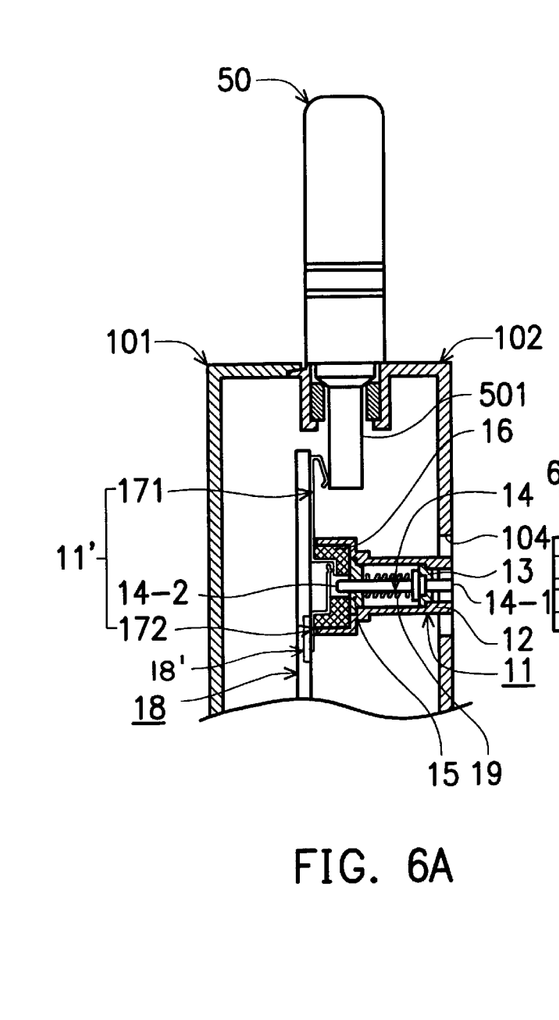
FIG. 6A is a partial sectional view showing the structure of the connecting device of the third embodiment of the invention.
Figure 6B:
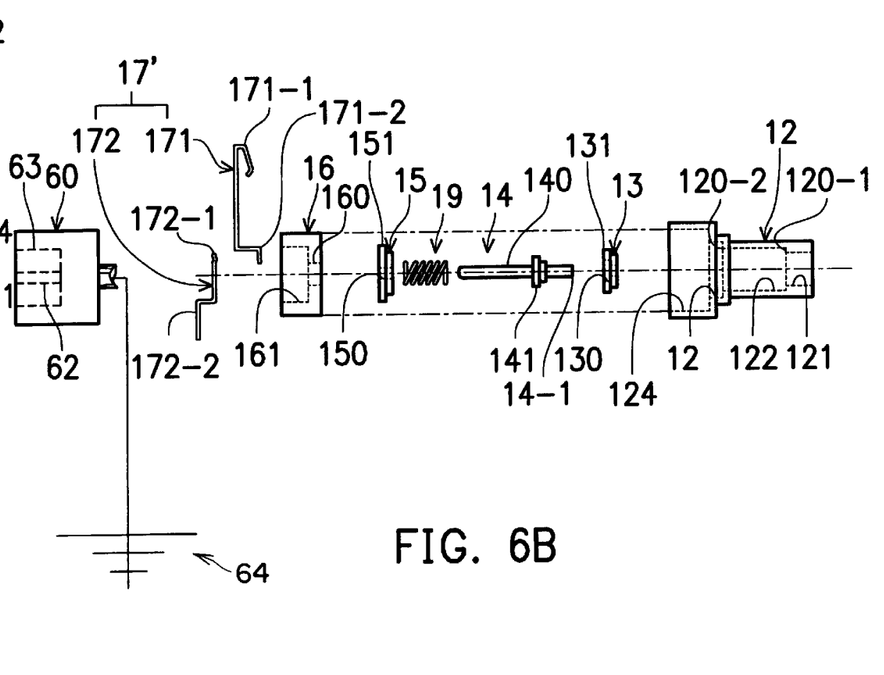
FIG. 6B is an exploded view showing the switch element and the connecting member of the connecting device shown in FIG. 6A.
Figure 7:
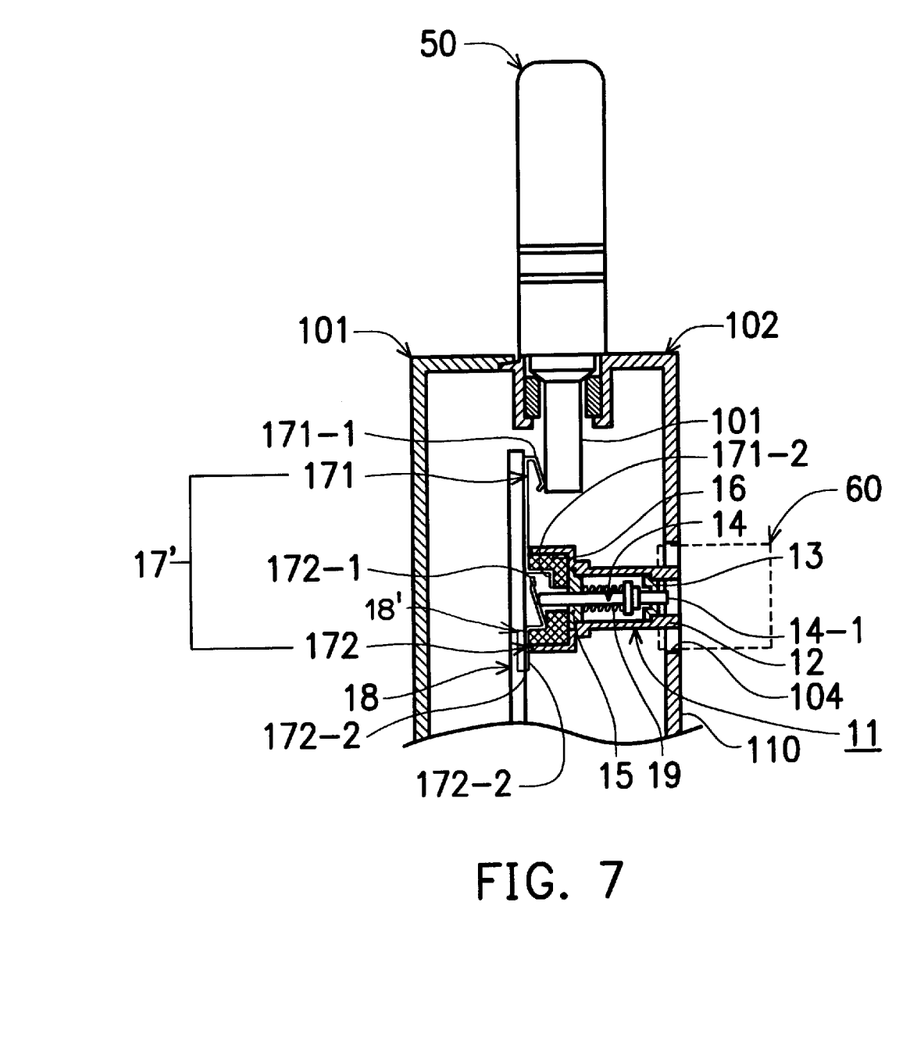
FIG. 7 is a partial sectional view showing the car antenna connected to the portable telephone by the connecting device of the third embodiment.

Turning to FIG. 6A, FIG. 6B and FIG. 7, a third embodiment of the connecting device of the invention is shown. In addition to providing a coil spring 19 between the second guiding member 15 and the metal pin 14, the switch element 17' in this embodiment is designed to be composed of two pieces of metal strip, 171 and 172. The first metal strip 171 is mounted on the circuit board 18 and has a hooked end 171-1 and a horizontally protruded end 171-2. The hooked end 171-1 is in contact with the bottom end 501 of the antenna 50. The second metal strip 172 is also mounted on the circuit board 18 with its end 172-2 being electrically connected to the internal circuit 18 and has a horizontally protruded end 172-1 which is in contact with the horizontally protruded end 171-2 when the connector 60 is not received in the recessed portion 104. When the connector 60 is received in the recessed portion 104, the end 172-1 of the second metal strip 172 is moved by the metal pin 14 so that the end 172-1 is detached from the end 171-2 to disconnect the antenna 50 so that the internal circuit 18 can receive the signals from a car antenna 64 via the connector 60.

What is claimed is:

1. An arrangement for connecting a car antenna having a connector to a portable telephone having an antenna, comprising:

a circuit board disposed in the portable telephone;

an internal circuit mounted on the circuit board;

a switch element that is electrically connected to the internal circuit and is mounted on the circuit board;

a connecting member mounted on the circuit board, comprising:

a base mounted in a receiving portion of the portable telephone;

a first guiding member received in the base;

a positioning member mounted on the circuit board;

a second guiding member received in the positioning member; and a metal pin slidably received between the first guiding member and the second guiding member;

wherein when the car antenna connector is received in the receiving portion, the switch element is electrically connected to the connector; and wherein when the car antenna connector is not received in the receiving portion, the switch element is electrically connected to the antenna of the portable telephone.

2. The device as claimed in claim 1, wherein the switch element is a curved metal strip.

3. The device as claimed in claim 1, further comprising a biasing member disposed between the second guiding member and the metal pin.

4. The device as claimed in claim 3, wherein the biasing member is a coil spring.

5. The device as claimed in claim 1, wherein the switch element comprises:

a first strip member mounted on the circuit board, the first strip member being in contact with the portable telephone antenna;

a second strip member mounted on the circuit board, the second strip member being in contact with the first strip member when the car antenna connector is not received in the receiving portion; and wherein when the car antenna connector is received in the receiving portion, the second strip member not being in contact with the first strip member but being in contact with the metal pin.

6. The device as claimed in claim 1, wherein the first guiding member, the second guiding member and the positioning member are made of non-conducting materials.

7. The connecting device as claimed in claim 6, wherein the first guiding member, the second guiding member and the positioning member are made of plastics.

* * * * *